United States Patent
Wang et al.

(10) Patent No.: US 8,243,053 B2
(45) Date of Patent: Aug. 14, 2012

(54) FLEXIBLE DISPLAY PANEL

(75) Inventors: Tzu-Ming Wang, Hsinchu (TW);
Yuan-Chih Tsai, Hsinchu (TW);
Ted-Hong Shinn, Hsinchu (TW)

(73) Assignee: E Ink Holdings Inc., Hsinchu County (TW)

( * ) Notice: Subject to any disclaimer, the term of this patent is extended or adjusted under 35 U.S.C. 154(b) by 477 days.

(21) Appl. No.: 12/505,521

(22) Filed: Jul. 19, 2009

(65) Prior Publication Data

US 2010/0238144 A1    Sep. 23, 2010

(30) Foreign Application Priority Data

Mar. 18, 2009   (TW) .............................. 98108837 A

(51) Int. Cl.
*G06F 3/038*   (2006.01)
(52) U.S. Cl. ........ 345/205; 345/204; 345/158; 345/169; 345/173; 345/901; 345/905; 361/616; 361/679.3; 455/556.2; 455/566; 715/864
(58) Field of Classification Search .................. 345/204, 345/158, 169, 173–178, 156, 207, 901, 905; 361/616, 679.3; 455/556.2, 566; 715/864
See application file for complete search history.

(56) References Cited

U.S. PATENT DOCUMENTS 5,855,344 A * 1/1999 Rogers ....................... 248/123.2
6,951,496 B2 * 10/2005 Koyama ..................... 445/25
2007/0181456 A1 * 8/2007 Kusuda et al. ............... 206/443
2008/0094561 A1 * 4/2008 Fan et al. ..................... 349/151
2008/0158173 A1 * 7/2008 Hamblin et al. ............. 345/173

FOREIGN PATENT DOCUMENTS

CN           101165580 A      4/2008

OTHER PUBLICATIONS

Office Action From China Patent Office.

* cited by examiner

*Primary Examiner* — Lun-Yi Lao
*Assistant Examiner* — Olga Merkoulova
(74) *Attorney, Agent, or Firm* — Chun-Ming Shih

(57) ABSTRACT

A flexible display panel includes a flexible panel body and at least one integrated circuit driver (IC driver). The flexible panel body has a first end surface, a second end surface, a plurality of side surfaces and at least one convex cambered surface. The first end surface has a display area. The second end surface is opposite to the first end surface. Each of the side surfaces connects the first end surface and the second end surface. Each adjacent two of the side surfaces connect each other. The convex cambered surface connects adjacent two of the side surfaces and connects the first end surface and the second end surface. The IC driver is disposed at the flexible panel body, located outside the display area, and adjacent to the convex cambered surface. In addition, another flexible display panel having a gravity-changing device is also provided.

8 Claims, 5 Drawing Sheets

FLEXIBLE DISPLAY PANEL

BACKGROUND

This application claims priority to a Taiwan application No. 098108837 filed on Mar. 18, 2009.

FIELD OF THE INVENTION

The present invention generally relates to a display panel, and more specifically, to a flexible display panel.

DESCRIPTION OF THE RELATED ART

With the vigorous growth of information and consumption electronics industries, electronic products such as liquid crystal displays, mobile phones, notebook computers, personal digital assistants and digital cameras and so on, have become an indispensable part of life. Each of the electronic products generally has a display panel which serves as a medium to show images.

The display panel can be designed to be flexible. A flexible display panel has a flexible panel body and a plurality of integrated circuit drivers (IC drivers). The flexible panel body has a top substrate, a bottom substrate and a liquid crystal layer disposed between the top substrate and the bottom substrate. Each of the IC drivers is disposed on the flexible panel body and the size of each of the IC drivers is smaller than that of the flexible panel body.

In a producing process, or during transportation or in use, the flexible display panel suffers various kinds of impact, for example, the flexible display panel falls on the ground. The impact resistance of the flexible panel body is good. However, due to the structure of each of the IC drivers itself or the electrical connection relationship between each of the IC drivers and the flexible panel body, the structure or the electrical connection of one of the IC drivers is easily damaged when the flexible display panel suffers impact such that the displaying function of the flexible display panel is more likely adversely affected. The above problem is worth striving to solve.

BRIEF SUMMARY

The present invention is directed to provide a flexible display panel of which the impact resistance is good.

The present invention provides a flexible display panel including a flexible panel body and at least one IC driver. The flexible panel body has a first end surface, a second end surface, a plurality of side surfaces and at least one convex cambered surface. The first end surface has a display area. The second end surface is opposite to the first end surface. Each of the side surfaces connects the first end surface and the second end surface. Each adjacent two of the side surfaces connect each other. The convex cambered surface connects adjacent two of the side surfaces and connects the first end surface and the second end surface. The IC driver is disposed at the flexible panel body, located outside the display area, and adjacent to the convex cambered surface.

In one embodiment of the present invention, the IC driver is disposed at the first end surface or the second end surface.

The present invention provides a flexible display panel having a center of gravity. The flexible display panel includes a flexible panel body, at least one IC driver, and at least one gravity-changing device. The flexible panel body comprises a first end surface, a second end surface and a plurality of side surfaces. The first end surface has a display area. The second end surface is opposite to the first end surface. Each of the side surfaces connects the first end surface and the second end surface. Each adjacent two of the side surfaces connect each other. The gravity-changing device is disposed at the flexible panel body, located outside the display area and adjacent to a joint portion of adjacent two of the side surfaces so that the center of gravity of the flexible display panel is adjacent to the joint portion. The IC driver is disposed at the flexible panel body, located outside the display area and far away from the joint portion.

In one embodiment of the present invention, the IC driver is disposed at the first end surface, and the gravity-changing device is disposed at the second end surface.

In one embodiment of the present invention, the flexible panel body further comprises a convex cambered surface, and the joint portion is composed of the convex cambered surface.

In one embodiment of the present invention, the flexible panel body further has a plurality of convex cambered surfaces, and each of the convex cambered surfaces connects adjacent two of the side surfaces and connects the first surface and the second surface. The joint portion is composed of one of the convex cambered surfaces.

In one embodiment of the present invention, the display area is adjacent to the joint portion.

Since the flexible display panel of the embodiment of the present invention has the convex cambered surface and the IC driver is adjacent to the convex cambered surface, when the convex cambered surface of the flexible display panel of the embodiment suffers impact, for example, the flexible display panel falls on the ground, the convex cambered surface can avoid stress concentration effect so as to reduce the adverse influence on the IC driver produced by the impact. Therefore, the IC driver suffering the impact is not easily damaged.

In addition, when the flexible display panel of the embodiment of the present invention falls on the ground, since the gravity-changing device is disposed at the flexible panel body so that the center of gravity of the flexible display panel is adjacent to the joint portion of the adjacent two of the side surfaces, the joint portion usually first contacts the ground and suffers relative large impact. Therefore, the IC driver far away from the joint portion suffers relative small impact and is not easily damaged.

BRIEF DESCRIPTION OF THE DRAWINGS

The accompanying drawings are included to provide a further understanding of the invention, and are incorporated in and constitute part of this specification. The drawings illustrate embodiments of the invention and, together with the description, serve to explain the principles of the invention.

DETAILED DESCRIPTION

Reference will now be made to the drawings to describe exemplary embodiments of the present invention in detail. The following description is given by way of example, and not limitation.

[First Embodiment]

Figure 1:
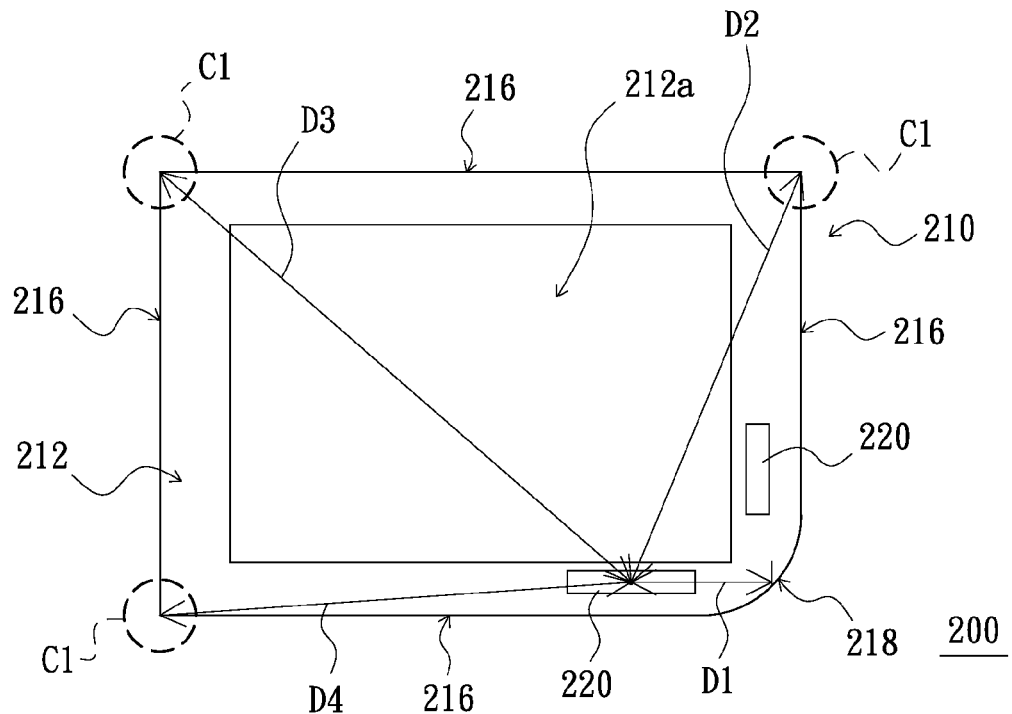
FIG. 1 is a schematic top view of a flexible display panel according to a first embodiment of the present invention.
Figure 2:
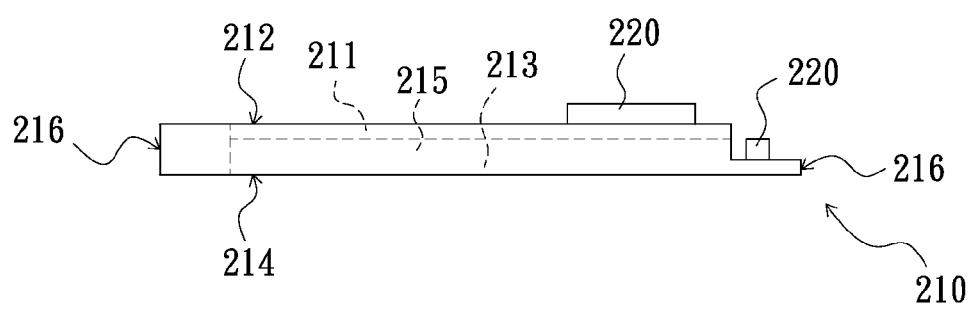
FIG. 2 is a schematic side view of the flexible display panel of FIG. 1.

FIG. 1 is a schematic top view of a flexible display panel according to a first embodiment of the present invention. FIG. 2 is a schematic side view of the flexible display panel of FIG. 1. Referring to FIG. 1 and FIG. 2, the flexible display panel 200 of this embodiment, a liquid crystal display panel or an electrophoretic display panel for example, includes a flexible panel body 210 and at least one IC driver 220 (two IC drivers are schematically shown in FIG. 1). The flexible panel body 210 has a first end surface 212, a second end surface 214, a plurality of side surfaces 216 and a convex cambered surface 218. The flexible panel body 210 has a top substrate 211, a bottom substrate 213 and a display layer 215 disposed between the top substrate 211 and the bottom substrate 213. The display layer 215 is, for example, a liquid crystal layer or an electrophoresis layer.

The first end surface 212 has a display area 212*a*. The display layer 215 is corresponding to the display area 212*a*. The display area 212*a* is used to display pictures including characters or images that users can read. The second end surface 214 is opposite to the first end surface 212. Each of the side surfaces 216 connects the first end surface 212 and the second end surface 214. Each adjacent two of the side surfaces 216 connect each other. The convex cambered surface 218 connects adjacent two of the side surfaces 216 and connects the first end surface 212 and the second end surface 214.

The IC drivers 220 are disposed at the first end surface 212 of the flexible panel body 210, located outside the display area 212*a*, and adjacent to the convex cambered surface 218. It should be noted that, according to the relative positions shown in FIG. 1, as for the IC driver 220 which is located lower, the sentence "the IC driver 220 is adjacent to the convex cambered surface 218" means that the distance D1 between the IC driver 220 and the convex cambered surface 218 is smaller than the distances D2, D3 or D4 between the IC driver 220 and other corners C1. In other words, as for the distances D1, D2, D3, D4, the distance D1 is smallest.

Since the flexible display panel 200 of this embodiment has the convex cambered surface 218 and each of the IC drivers 220 is adjacent to the convex cambered surface 218, when the convex cambered surface 218 of the flexible display panel 200 of this embodiment suffers impact, for example, the flexible display panel 200 falls on the ground, the convex cambered surface 218 can avoid stress concentration effect so as to reduce the adverse influence on the IC drivers 220 produced by the impact. Therefore, the IC drivers 220 suffering the impact are not easily damaged.

[Second Embodiment]

Figure 3:
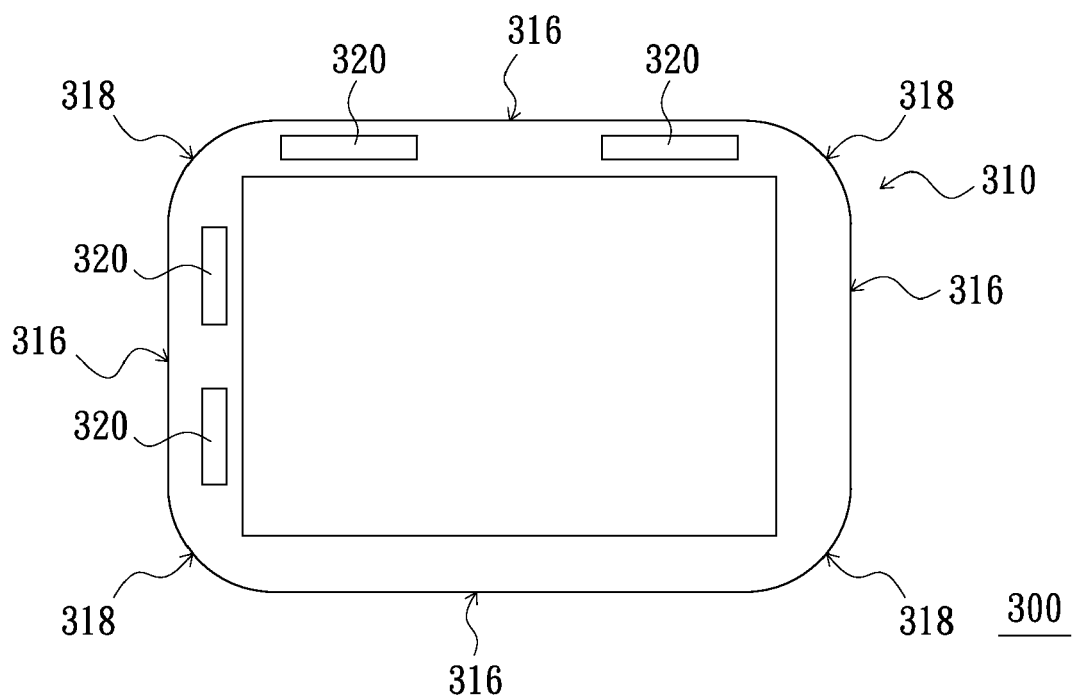
FIG. 3 is a schematic top view of a flexible display panel according to a second embodiment of the present invention.

FIG. 3 is a schematic top view of a flexible display panel according to a second embodiment of the present invention. The difference between the flexible display panel 300 of this embodiment and the flexible display panel 200 of the first embodiment is that the flexible panel body 310 of the flexible display panel 300 of this embodiment has a plurality of convex cambered surfaces 318. Each of the convex cambered surfaces 318 connects adjacent two of the side surfaces 316.

Since the flexible display panel 300 of this embodiment has the convex cambered surfaces 318 and each of the IC drivers 220 is adjacent to the corresponding convex cambered surface 318, when the convex cambered surfaces 318 of the flexible display panel 300 of this embodiment suffer impact, the convex cambered surfaces 318 can avoid stress concentration effect so as to reduce the adverse influence on the IC drivers 320 produced by the impact. Therefore, the IC drivers 320 suffering the impact are more difficult damaged.

[Third Embodiment]

Figure 4:
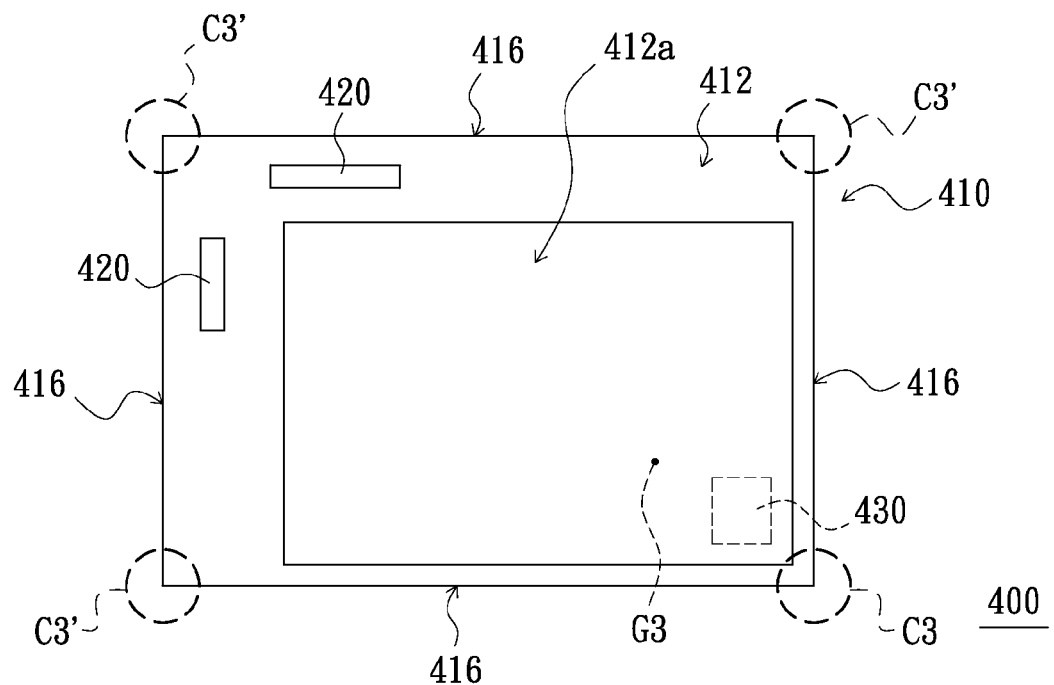
FIG. 4 is a schematic top view of a flexible display panel according to a third embodiment of the present invention.
Figure 5:
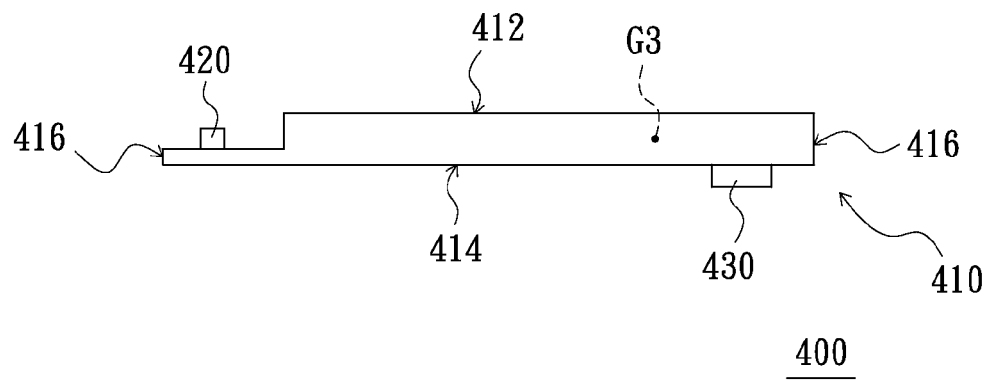
FIG. 5 is a schematic side view of the flexible display panel of FIG. 4.
Figure 6:
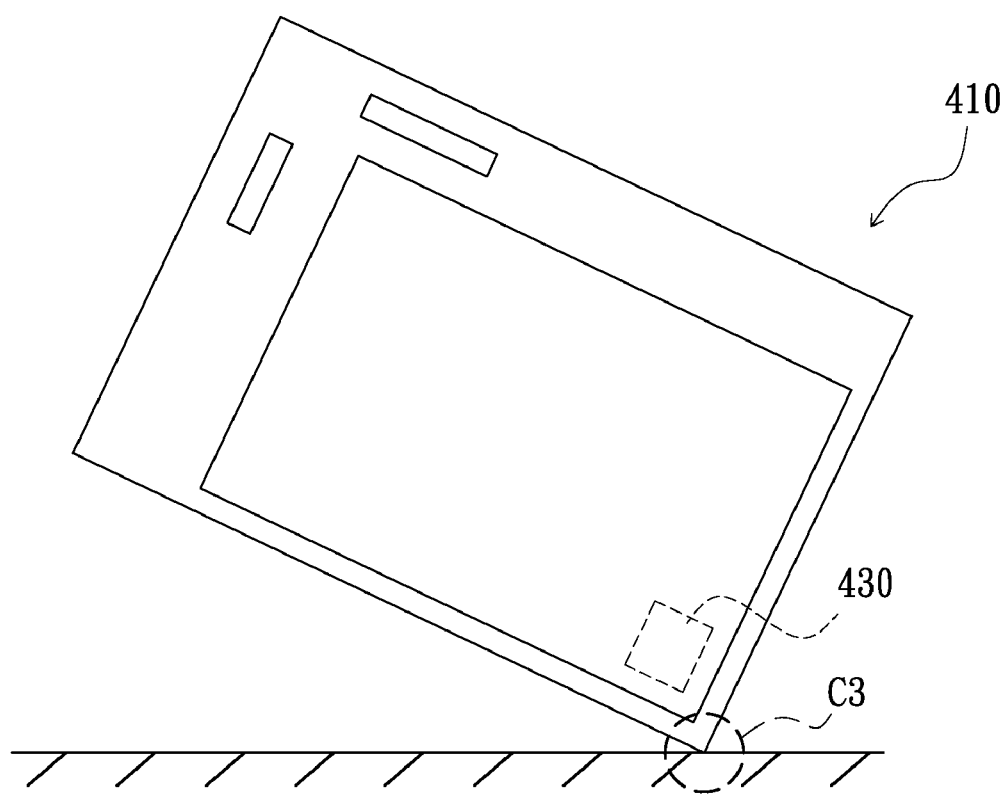
FIG. 6 is a schematically showing the flexible display panel of FIG. 4 falling on the ground.

FIG. 4 is a schematic top view of a flexible display panel according to a third embodiment of the present invention. FIG. 5 is a schematic side view of the flexible display panel of FIG. 4. FIG. 6 is a schematically view showing the flexible display panel of FIG. 4 falling on the ground. Referring to FIG. 4 and FIG. 5, the flexible display panel 400 of this embodiment includes a flexible panel body 410, at least one IC driver 420 (two IC drivers are schematically shown in FIG. 4) and at least one gravity-changing device 430.

The flexible panel body 410 has a first end surface 412, a second end surface 414, and a plurality of side surfaces 416. The first end surface 412 has a display area 412*a*. The second end surface 414 is opposite to the first end surface 412. Each of the side surfaces 416 connects the first end surface 412 and the second end surface 414. Each adjacent two of the side surfaces 416 connect each other.

The gravity-changing device 430 is disposed at the second end surface 414 of the flexible panel body 410. The gravity-changing device 430 is located outside the display area 412*a* and adjacent to a joint portion C3 of adjacent two of the side surfaces 416, that is, the lower-right corner C3 in FIG. 4 so that a center of gravity G3 of the flexible display panel 400 is adjacent to the joint portion C3. In this embodiment, the display area 412*a* is also adjacent to the joint portion C3.

The IC drivers 420 are disposed at the first end surface 412 of the flexible panel body 410, located outside the display area 412*a*, and far away from the joint portion C3. It should be noted that, according to the relative positions shown in FIG. 4, as for the IC driver 420 which is located leftmost, the sentence "the IC driver 420 is far away from the joint portion C3" means that the distance between the IC driver 420 and the joint portion C3 is larger than that between the gravity-changing device 430 and the joint portion C3.

Referring to FIG. 4 and FIG. 6, when the flexible display panel 400 of this embodiment falls on the ground, since the gravity-changing device 430 is disposed at the flexible panel body 410 so that the center of gravity G3 of the flexible display panel 400 is adjacent to the joint portion C3, the joint portion C3 usually first contacts the ground and suffers relative large impact. Therefore, the IC drivers 420 far away from the joint portion C3 suffers relative small impact and is not easily damaged.

[Fourth Embodiment]

Figure 7:
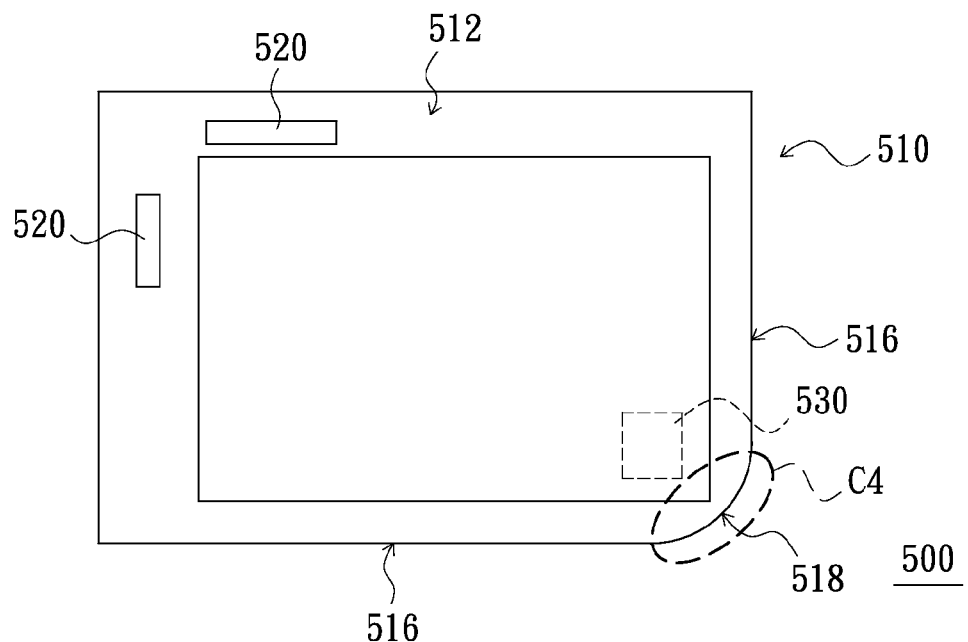
FIG. 7 is a schematic top view of a flexible display panel according to a forth embodiment of the present invention.

FIG. 7 is a schematic top view of a flexible display panel according to a forth embodiment of the present invention. The difference between the flexible display panel 500 of this embodiment and the flexible display panel 400 of the third embodiment is that the flexible panel body 510 of the flexible display panel 500 of this embodiment has a convex cambered surface 518. The convex cambered surface 518 connects the two of the side surfaces 516 adjacent to the gravity-changing device 530 and connects the first end surface 512 and a second end surface (not shown) opposite to the first end surface 512. In this embodiment, the joint portion C4 of the two of the side surfaces 516 adjacent to the gravity-changing device 530 is composed of the convex cambered surface 518.

When the flexible display panel 500 of this embodiment falls on the ground, since the joint portion C4 of the two of the side surfaces 516 adjacent to the gravity-changing device 530 is composed of the convex cambered surface 518, the convex cambered surfaces 518 which usually first contacts the ground can avoid stress concentration effect so as to reduce the adverse influence on the IC drivers 520 produced by the impact of falling. Therefore, the IC drivers 520 suffer relative small impact and are not easily damaged.

[Fifth Embodiment]

Figure 8:
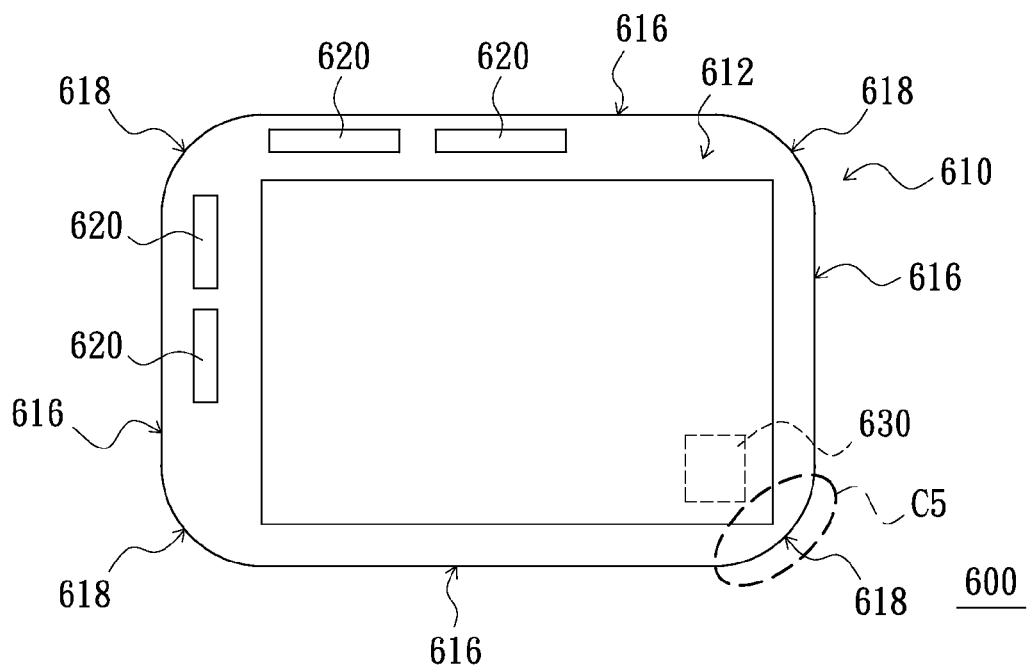
FIG. 8 is a schematic top view of a flexible display panel according to a fifth embodiment of the present invention.

FIG. 8 is a schematic top view of a flexible display panel according to a fifth embodiment of the present invention. The difference between the flexible display panel 600 of this embodiment and the flexible display panel 500 of the fourth embodiment is that the flexible panel body 610 of the flexible display panel 600 of this embodiment has a plurality of convex cambered surfaces 618. Each of the convex cambered surfaces 618 connects adjacent two of the side surfaces 616 and connects the first surface 612 and a second surface (not shown). The joint portion C5 adjacent to the gravity-changing device 630 is composed of one of the convex cambered surface 618. The convex cambered surfaces 618 can further reduce the adverse influence on the IC drivers 620 produced by other impact, i.e. improper collision.

As mentioned above, the flexible display panel of one of the embodiments of the present invention has at least one of the following advantages or other advantages.

First, since the flexible display panel of the embodiment of the present invention has the convex cambered surface and the IC driver is adjacent to the convex cambered surface, when the convex cambered surface of the flexible display panel of the embodiment suffers impact, for example, the flexible display panel falls on the ground, the convex cambered surface can avoid stress concentration effect so as to reduce the adverse influence on the IC driver produced by the impact. Therefore, the IC driver suffering the impact is not easily damaged.

Second, when the flexible display panel of the embodiment of the present invention falls on the ground, since the gravity-changing device is disposed at the flexible panel body so that the center of gravity of the flexible display panel is adjacent to the joint portion of the adjacent two of the side surfaces, the joint portion usually first contacts the ground and suffers relative large impact. Therefore, the IC driver far away from the joint portion suffers relative small impact and is not easily damaged.

The above description is given by way of example, and not limitation. Given the above disclosure, one skilled in the art could devise variations that are within the scope and spirit of the invention disclosed herein, including configurations ways of the recessed portions and materials and/or designs of the attaching structures. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A flexible display panel having a center of gravity comprising: a flexible panel body having: a first end surface having a display area; a second end surface opposite to the first end surface; and a plurality of side surfaces, wherein each of the side surfaces connects the first end surface and the second end surface, and each adjacent two of the side surfaces connect each other; and at least one gravity device disposed at the flexible panel body, located outside the display area and adjacent to a first joint portion of adjacent two of the side surfaces so that the center of gravity of the flexible display panel is adjacent to the first joint portion; and at least one integrated circuit driver disposed at the flexible panel body, located outside the display area, and far away from the joint portion adjacent to a second joint portion of another adjacent two of the side surfaces, wherein the first joint portion and the second joint portion are positioned at two diagonal corners of the flexible display panel, and wherein the at least one gravity device, which locates the center of gravity adjacent to the first joint portion, causes the first joint portion to suffer a larger impact then an impact of the second joint portion, thereby not easily damaging the integrated circuit driver, when the flexible display panel falls on the ground.

2. The flexible display panel as claimed in claim 1, wherein the integrated circuit driver is disposed at the first end surface, and the gravity device is disposed at the second end surface.

3. The flexible display panel as claimed in claim 1, wherein the flexible panel body further comprises a convex cambered surface, and the first joint portion is composed of the convex cambered surface.

4. The flexible display panel as claimed in claim 1, wherein the flexible panel body further has a plurality of convex cambered surfaces, and each of the convex cambered surfaces connects adjacent two of the side surfaces and connects the first surface and a second surface, and the first joint portion is composed of one of the convex cambered surfaces.

5. The flexible display panel as claimed in claim 1, wherein the display area is adjacent to the first joint portion.

6. The flexible display panel as claimed in claim 1, wherein the second joint portion includes a convex cambered surface connecting the first end surface and the second end surface, and the at least one integrated circuit driver is disposed adjacent to the convex cambered surface.

7. The flexible display panel as claimed in claim 1, wherein the at least one integrated circuit driver is disposed at the second end surface.

8. The flexible display panel as claimed in claim 4, wherein the second joint portion is composed of another one of the convex cambered surfaces, and the at least one integrated circuit driver is disposed adjacent to the another one of the convex cambered surfaces.

* * * * *